US012333807B2

(12) United States Patent
David et al.

(10) Patent No.: US 12,333,807 B2
(45) Date of Patent: Jun. 17, 2025

(54) OBJECT DATA GENERATION FOR REMOTE IMAGE PROCESSING

(71) Applicant: Microsoft Technology Licensing, LLC, Redmond, WA (US)

(72) Inventors: Moshe David, Giv'atayim (IL); Aviv Hurvitz, Tel Aviv (IL); Eyal Krupka, Shimshit (IL); Qingfen Lin, Redmond, WA (US); Arash Ghanaie-Sichanie, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 608 days.

(21) Appl. No.: 17/328,592

(22) Filed: May 24, 2021

(65) Prior Publication Data

US 2022/0374636 A1 Nov. 24, 2022

(51) Int. Cl.
*G06V 20/40* (2022.01)
*G06T 7/20* (2017.01)
(Continued)

(52) U.S. Cl.
CPC ............... *G06V 20/41* (2022.01); *G06T 7/20* (2013.01); *G06T 7/70* (2017.01); *G06V 10/22* (2022.01);
(Continued)

(58) Field of Classification Search
CPC ...... G06V 20/41; G06V 10/22; G06V 40/161; G06T 7/20; G06T 7/70;
(Continued)

(56) References Cited

U.S. PATENT DOCUMENTS

| 7,738,707 B2 | 6/2010 | Wiedemann et al. |
| 8,050,917 B2 | 11/2011 | Caspi et al. |

(Continued)

FOREIGN PATENT DOCUMENTS

EP 2055088 A2 5/2009

OTHER PUBLICATIONS

"Data Centered Collaboration in a Mobile Environment", Maciej Panka, Piotr Bala, Proceedings of the Federated Conference on Computer Science and Information Systems, pp. 723-728, ISBN 978-83-60810-39-2, Pub. Sep. 18, 2011 (Year: 2011).*
(Continued)

*Primary Examiner* — Nancy Bitar
*Assistant Examiner* — Heath E. Wells
(74) *Attorney, Agent, or Firm* — NovoTechIP International PLLC

(57) ABSTRACT

In a system including a processor and memory, the memory includes instructions that, when executed by the processor, cause the processor to control the system to perform receiving a video stream capturing objects; identifying, based on the received video stream, object areas corresponding to the objects, respectively; tracking the object areas in the received video stream; generating, based on the tracking of the object areas, visual data sets at a plurality of times, wherein each visual data set is generated at a different time and includes visual data representing each object area; determining a priority of each visual data in each visual data set; selecting, based on the determined priority of each visual data, a group of the visual data to be transmitted to a remote system; and transmitting, to the remote system, the selected group of the visual data.

20 Claims, 14 Drawing Sheets

(51) Int. Cl.
*G06T 7/70* (2017.01)
*G06V 10/22* (2022.01)
*G06V 40/16* (2022.01)
*G10L 25/57* (2013.01)
*H04N 7/15* (2006.01)

(52) U.S. Cl.
CPC ............ *G06V 40/161* (2022.01); *G10L 25/57* (2013.01); *H04N 7/15* (2013.01); *G06T 2207/10016* (2013.01); *G06T 2207/30201* (2013.01)

(58) Field of Classification Search
CPC . G06T 2207/10016; G06T 2207/30201; G10L 25/57; H04N 7/15; H04N 7/155
USPC .......................................................... 382/103
See application file for complete search history.

(56) References Cited

U.S. PATENT DOCUMENTS

| | | | | |
|---|---|---|---|---|
| 9,430,695 | B2* | 8/2016 | Summers | H04N 7/15 |
| 10,788,798 | B2 | 9/2020 | Sinha et al. | |
| 10,878,342 | B2 | 12/2020 | Chew | |
| 11,670,147 | B2* | 6/2023 | Kanga | G06V 20/52 |
| | | | | 348/159 |
| 2009/0210491 | A1 | 8/2009 | Thakkar et al. | |
| 2012/0327177 | A1* | 12/2012 | Kee | H04N 7/15 |
| | | | | 348/E7.083 |
| 2013/0271559 | A1* | 10/2013 | Feng | H04N 7/142 |
| | | | | 348/14.08 |
| 2013/0294594 | A1 | 11/2013 | Chervets et al. | |
| 2016/0019426 | A1* | 1/2016 | Tusch | G06V 20/47 |
| | | | | 386/286 |
| 2018/0260825 | A1 | 9/2018 | Rashid et al. | |
| 2019/0341050 | A1* | 11/2019 | Diamant | G06V 40/172 |
| 2020/0105111 | A1* | 4/2020 | Messer | G06V 40/50 |
| 2020/0211347 | A1* | 7/2020 | Stewart | G06V 20/52 |
| 2021/0092403 | A1* | 3/2021 | Hsu | H04N 19/132 |
| 2021/0225017 | A1* | 7/2021 | Holzer | G06T 7/75 |
| 2022/0237735 | A1* | 7/2022 | Zingade | G06V 20/40 |
| 2022/0239513 | A1* | 7/2022 | Swierk | G06V 40/18 |
| 2022/0366683 | A1* | 11/2022 | Pereg | G06V 10/25 |

OTHER PUBLICATIONS

"Face detection", Retrieved from: https://en.wikipedia.org/wiki/Face_detection, Dec. 17, 2020, 4 Pages.

"Mean shift", Retrieved from: https://en.wikipedia.org/wiki/Mean_shift, Dec. 5, 2020, 7 Pages.

"Speaker diarisation", Retrieved from: https://en.wikipedia.org/wiki/Speaker_diarisation, Sep. 8, 2020, 3 Pages.

Bekmanis, Winnie, "Bringing AI at the Edge to Smart Cameras on the IoT", Retrieved from: https://www.qualcomm.com/news/onq/2020/07/07/bringing-ai-edge-smart-cameras-internet-things, Jul. 7, 2020, 8 Pages.

Jadhav, et al., "Human Identification using Face and Voice Recognition", In International Journal of Computer Science and Information Technologies, vol. 2, Issue 3, May 3, 2011, pp. 1248-1252.

Sharma, SID, "AI Can See Clearly Now: GANs Take the Jitters Out of Video Calls", Retrieved From: https://blogs.nvidia.com/blog/2020/10/05/gan-video-conferencing-maxine/, Oct. 5, 2020, pp. 1-36.

* cited by examiner

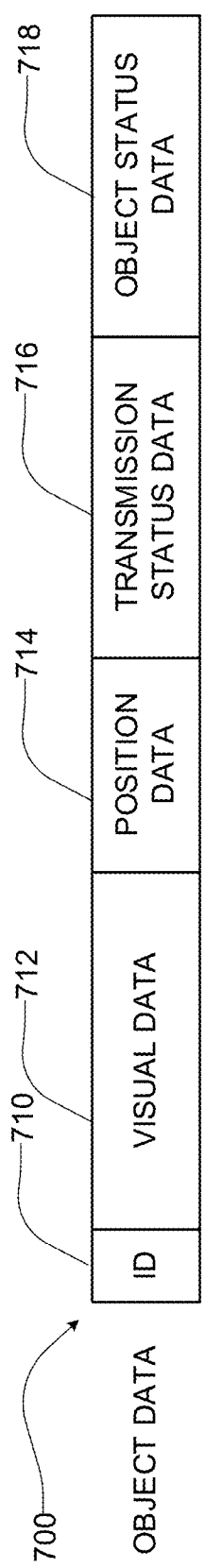
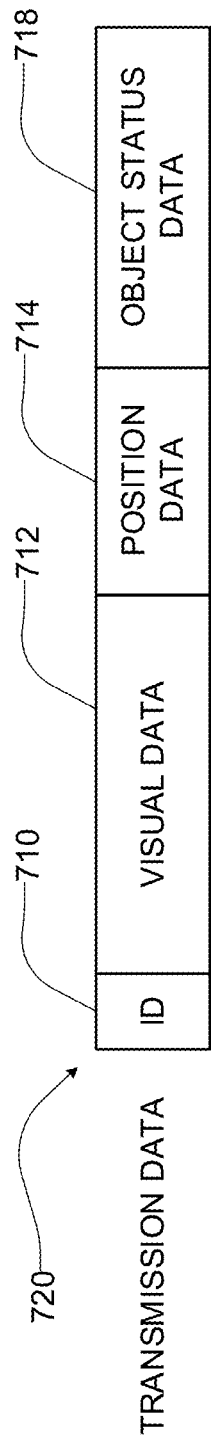
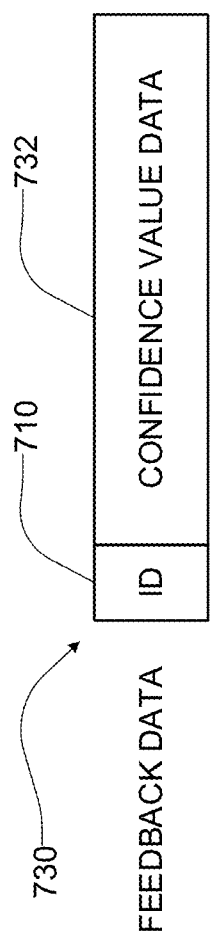
FIG. 7A
FIG. 7B
FIG. 7C

| TRANSMISSION DATA 720A_t(n) | TRANSMISSION DATA 720B_t(n) | TRANSMISSION DATA 720C_t(n) | TRANSMISSION DATA 720D_t(n) | TRANSMISSION DATA 720E_t(n) |
|---|---|---|---|---|

FIG. 7E

| FEEDBACK DATA (78% Confidence) 730A_t(n) | FEEDBACK DATA (84% Confidence) 730B_t(n) | FEEDBACK DATA (47% Confidence) 730C_t(n) | FEEDBACK DATA (65% Confidence) 730D_t(n) | FEEDBACK DATA (18% Confidence) 730E_t(n) |
|---|---|---|---|---|

FIG. 7F

| TRANSMISSION DATA 720E_t(n+1) | TRANSMISSION DATA 720C_t(n+1) | TRANSMISSION DATA 720D_t(n+1) | TRANSMISSION DATA 720A_t(n+1) | TRANSMISSION DATA 720B_t(n+1) |
|---|---|---|---|---|

| TRANSMISSION DATA 720E_t(m) | TRANSMISSION DATA 720C_t(m) | TRANSMISSION DATA 720D_t(m) |

FIG. 8C

| FEEDBACK DATA (24% Confidence) 730E_t(m) | FEEDBACK DATA (37% Confidence) 730C_t(m) | FEEDBACK DATA (85% Confidence) 730D_t(m) |

FIG. 8D

| TRANSMISSION DATA 720F_t(m+1) | TRANSMISSION DATA 720E_t(m+1) | TRANSMISSION DATA 720C_t(m+1) |

| TRANSMISSION DATA 720C_t(l) | TRANSMISSION DATA 720D_t(l) |
|---|---|

FIG. 9A

| FEEDBACK DATA (37% Confidence) 730C_t(l) | FEEDBACK DATA (42% Confidence) 730D_t(l) |
|---|---|

FIG. 9B

| TRANSMISSION DATA 720C_t(l+1) | TRANSMISSION DATA 720D_t(l+1) | TRANSMISSION DATA 720B_t(l+1) | TRANSMISSION DATA 720E_t(l+1) | TRANSMISSION DATA 720F_t(l+1) |
|---|---|---|---|---|

FIG. 9C

OBJECT DATA GENERATION FOR REMOTE IMAGE PROCESSING

BACKGROUND

With advancement of information and communication technologies, high bandwidth internet services have become much more affordable, and the market is filled with various sophisticated hardware and software products and services providing high speed, high media quality and real-time communication solutions. Now video chats, virtual meetings and teleconferences have become as common as what telephone calls once were just a few decades ago, and more and more people are taking advantages of convenience and productiveness that these indirect contact communication solutions offer. While video chats are commonly conducted between two parties who are familiar with each other, virtual meetings and videoconferencing sessions are very often conducted among two or more geographically separated groups of participants who do not know or are not familiar with the participants of other groups. Even though participants normally introduce themselves at an early stage of a meeting or conference session, it is difficult to memorize each participant's name especially when a large number of participants are present. Hence, some participants may participate in virtual meetings or videoconferencing sessions without knowing who are participating, what are other participants' titles or responsibilities, who were supposed to be present but did not join, who have spoken, who have left, who have arrived late, etc. Also, virtual meetings or videoconferencing sessions are very often recorded and transcribed for archiving or future references, but such recordings and transcripts typically contain video and audio data and do not provide information on participants, absentees, speakers, etc. As such, there still remain significant areas for new and improved implementations for aiding virtual meeting or video conferencing session participants with participant identity information.

SUMMARY

In an implementation, a system for transmitting object visual data for remote image processing includes a processor and a computer-readable medium in communication with the processor. The computer-readable medium comprising instructions that, when executed by the processor, cause the processor to control the system to perform receiving a video stream capturing a plurality of objects; identifying, based on the received video stream, a plurality of object areas corresponding to the plurality of objects, respectively, each object area capturing at least a portion of the corresponding object; tracking the plurality of object areas in the received video stream; generating, based on the tracking of the plurality of object areas, a plurality of visual data sets at a plurality of times, wherein each visual data set is generated at a different time and includes visual data representing each object area; determining a priority of each visual data in each visual data set based on at least one of a confidence value of the visual data presenting a same object area of a previous time, the confidence value received from a remote system via a communication network; a most recent time of transmitting the visual data representing a same object area to the remote system via the communication network; and a new object in the received video stream; selecting, based on the determined priority of each visual data, a group of the visual data to be transmitted to the remote system; and transmitting, to the remote system via the communication network, the selected group of the visual data.

In another implementation, a non-transitory computer-readable medium comprising instructions that, when executed by a processor, cause the processor to control a system to perform receiving a video stream capturing a plurality of objects; identifying, based on the received video stream, a plurality of object areas corresponding to the plurality of objects, respectively, each object area capturing at least a portion of the corresponding object; tracking the plurality of object areas in the received video stream; generating, based on the tracking of the plurality of object areas, a plurality of visual data sets at a plurality of times, wherein each visual data set is generated at a different time and includes visual data representing each object area; determining a priority of each visual data in each visual data set based on at least one of a confidence value of the visual data presenting a same object area of a previous time, the confidence value received from a remote system via a communication network; a most recent time of transmitting the visual data representing a same object area to the remote system via the communication network; and a new object in the received video stream; selecting, based on the determined priority of each visual data, a group of the visual data to be transmitted to the remote system; and transmitting, to the remote system via the communication network, the selected group of the visual data.

In another implementation, a method of operating a system for transmitting visual data to a remote system, comprising receiving a video stream capturing a plurality of objects; identifying, based on the received video stream, a plurality of object areas corresponding to the plurality of objects, respectively, each object area capturing at least a portion of the corresponding object; tracking the plurality of object areas in the received video stream;

generating, based on tracking of the plurality of object areas, a plurality of visual data sets at a plurality of times, wherein each visual data set is generated at a different time and includes visual data representing each object area; determining a priority of each visual data in each visual data set based on at least one of a confidence value of the visual data presenting a same object area of a previous time, the confidence value received from the remote system via a communication network; a most recent time of transmitting the visual data representing a same object area to the remote system via the communication network; and a new object in the received video stream; selecting, based on the determined priority of each visual data, a group of the visual data to be transmitted to the remote system; and transmitting, to the remote system via the communication network, the selected group of the visual data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 7A illustrates an example data structure of object data associated with an object.

FIG. 7B illustrates an example data structure of transmission data generated and transmitted by a local host device.

FIG. 7C illustrates an example data structure of feedback data generated and transmitted by a remote system.

FIG. 7E illustrates an example transmission data set transmitted to the remote system via the communication network.

FIG. 7F illustrates an example feedback data set transmitted from the remote system via the communication network.

FIG. 7G illustrates another example transmission data set prioritized and selected based on the feedback data set of FIG. 7F.

FIG. 8B illustrates another example transmission data set generated based on the video stream of 8A.

FIG. 8C illustrates another example feedback data set generated by the remote system.

FIG. 8D illustrates another example transmission data set prioritized and selected based on the feedback data set of FIG. 8C and other information.

FIG. 9A illustrates another example transmission data set generated at a different time.

FIG. 9B illustrates another example feedback data set generated by the remote system.

FIG. 9C illustrates another example transmission data set prioritized and selected based on the feedback data set of FIG. 9B.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to reducing an amount of data that needs to be transmitted to a remote system while providing sufficient data for remote image processing. From a received video stream, a plurality of object areas (e.g., facial areas) are identified and tracked. Based on tracking of the object areas in the video stream, visual data representing each object area is generated. Then, each visual data is prioritized based on various factors, and a decision is made as to whether each visual data needs to be transmitted to the remote system. Through the prioritization and selection processes, only the necessary visual data for remote image processing is transmitted to the remote system. Hence, an amount of data transmitted to the remote system may be significantly reduced while sufficient visual data is transmitted to the remote system for remote image processing. Accordingly, the description provides practical and feasible technical solutions to the technical problems that, in order to ensure successful remote image processing, it was necessary to transmit a video stream of a full field of view (FOV), which is encoded with a high fidelity compression or uncompressed, to the remote system, which requires transmitting a large amount of data at a very high transmission rate which most networks cannot support.

Figure 1:
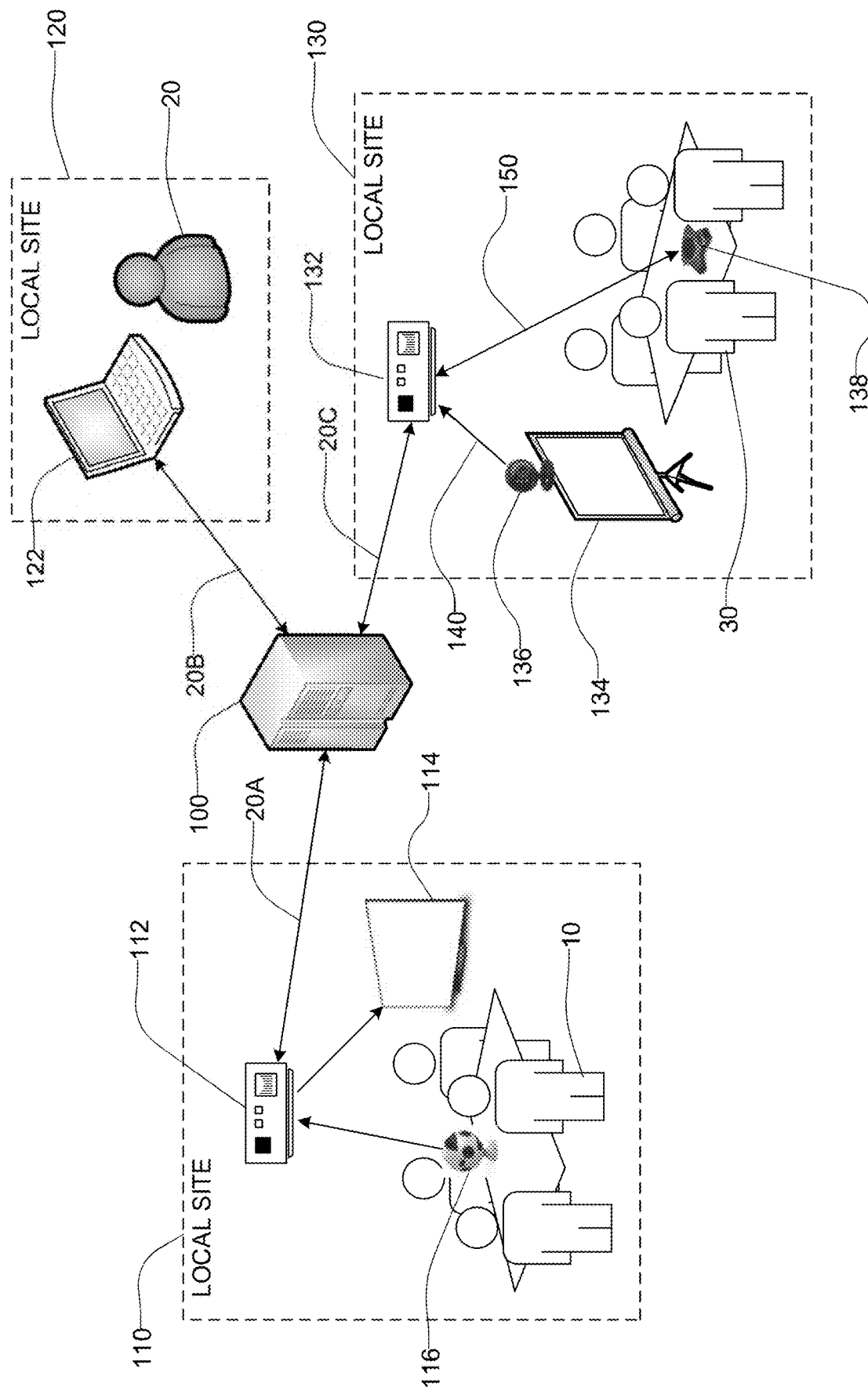
FIG. 1 illustrates an implementation of a videoconferencing session among a plurality of local sites.

FIG. 1 illustrates an implementation of a videoconferencing session among a plurality of participants 10, 20 and 30 distributed at a number of geographically separate local sites, such as first, second and third local sites 110, 120 and 130, which are connected to a conference host server 100 via communication networks 20A, 20B and 20C, respectively. Each of the local sites 110, 120 and 130 may operate one or more conference devices to carry out a real-time videoconferencing session. For example, the first local site 110 is a conference room where participants 10 are sitting around a table and looking at a display 114 (e.g., a television, projector, monitor, etc.). A camera 116 is placed at the center of the table and captures images of the first local site 110. For example, the camera 116 is a 360° surround camera capturing surround images of the participants 10 sitting around the table. The camera 116 may also include one or more microphones to capture speech and sounds of the first local site 110. Such conference devices 114 and 116 are connected to and controlled by a local host device 112, which is connected to the server 100 via a communication network 20A (e.g., an internet, intranet, etc.). The local host device 112 receives, from the camera 116, the captured local video images and sounds and generates local video and audio streams, which are transmitted to the server 100 via the communication network 20A. The local host device 112 receives, from the server 100 via the communication network 20A, video and audio streams capturing image and sounds of other local sites 120 and 130. The local host device 112 then distributes the received video and audio streams to the television 114, which in turn reproduces the images and sounds of the local sites 120 and 130.

Different sites may have different hardware/software configurations. For example, the second local site 120 may be a home of the participant 20 where the participant 20 operates a laptop computer 122 to participate the videoconferencing session. The laptop computer 122 captures local images and sounds, and generates and transmits local video and audio streams to the server 100 via a communication network 20B. The laptop computer 122 also receives, from the server 100, video and audio streams capturing images and sounds of other local sites 110 and 130, and reproduces, via, for example, a display and microphone integrated to the laptop 122, the images and sounds of the local sites 110 and 130. The third local site 130 is a conference room where participants 30 are sitting around a conference table and looking at a display 134 (e.g., a projector, etc.). A camera 136 is mounted on the display 134 to capture images of the participants 30, and a speaker/microphone unit 138 is placed at a center of the table. The display 134, camera 136 and speaker/microphone unit 138 are connected to a local host device 132 connected to the server 100 via a communication network 20C. The local host device 132 transmits, to the server 100 via the communication network 20C, video stream 140 and audio stream 150 capturing video and sounds of the third local site 130 captured by the camera 136 and speaker microphone unit 138. The local host device 132 also receives, from the server 100 via the communication network 20C, video and audio streams capturing images and sounds of other local sites 110 and 120, and distributes the received video and audio streams to the display 134 and speaker/microphone unit 138.

In a videoconferencing session, for example the videoconference setting shown in FIG. 1, some participants may be familiar with each other, but others may not know other participants at all. For example, the local site 120 may be a home office of an executive 20 in Seattle, U.S., where she or he is participating a videoconference session with developers 10 at the second site 110 in Israel and marketing team members 30 at the third site 130 in London, England. Due to the geographical distances, the executive 20 may not have been acquainted with other participants 10 and 30 at the first and third local sites 110 and 130. Typically, the participants 10, 20 and 30 would introduce themselves at an early stage of the videoconferencing, but it may be difficult for the executive 20 to remember names, titles, etc. of all other participants 10 and 30. Also, the executive 20 would not be able to know whether everyone invited to the conferencing session is present at the first and third local sites 110 and 130, and, if not, which participant or participants are absent. In addition, the executive 20 would not know if any uninvited participant is present at the local site 110 or 130. Further, if a new participant joins the on-going videoconference or a participant leaves before the videoconferencing sessions terminates, the executive 20 would want to know their identity information (e.g., names, titles, organizations, responsibilities. etc.). Hence, the executive 20 at the second local site 120 may feel much more comfortable or engaged if identity information of the participants 10 and 30 at the first and third sites 110 and 130 are automatically determined and provided to her or his laptop 122 or other devices (e.g., a mobile phone, tablet, smart watch, media terminal, VR/AR set, etc.) located at the second local site 120. The participants 10 and 30 at the first and third local sites 110 and 130 may also benefit from identity information of the participants at other local sites 120 and 130.

To determine identities of the participants 10, 20 and 30, face recognition may be individually performed at each of the first, second and third local sites 110, 120 and 130. For example, the local host device 112 may process an image captured by the camera 116 to perform face recognition and identification determination. However, a single image may not be sufficient to confidently identify the participants 10 because the participants 10 are always in motion and their faces may be very often turned away from a video capturing device (e.g., cameras 116) or blocked by other participants. Hence, images of a scene at each local site need to be continuously captured and processed, which requires fast processing speed and high processing power. Currently, however, most conference-related devices (e.g., camera/microphone unit 116, camera 136, speaker/microphone unit 138, etc.) are not configured to handle such demanding processing jobs. Also, the local host devices 112 and 132 are configured to handle communication between the local conference-related devices and the server 100 and may not be equipped to process the local video and audio streams and determine identities of the participants 10 and 30. Further, to retain an explicit control over face recognition/identification detection technologies, developers may prefer providing their proprietary solutions as a face recognition/identification detection service running at the server 100, rather than disclosing and sharing their proprietary technologies with hardware manufacturers who have manufactured the local host devices 112 and 132, laptop 122, etc., or service providers providing videoconferencing services subscribed by the first to third local sites 110, 120 and 130, Hence, the server 100 may be used to perform image processing (e.g., facial recognition, identification detection, etc.) based on the video and audio streams received from the local sites 110, 120 and 130 to determine identities of the participants 10, 20 and 30. However, in order to reduce a data transmission size and take up less bandwidth, the video and audio streams transmitted from the local sites 10, 20 and 30 are encoded and compressed before being transmitted to the server 100, and an image quality of the video data received by the server 100 may not be sufficient for the server 100 to perform image processing. To remedy this shortcoming, the local sites 110, 120 and 130 may need to transmit, to the server 100, video streams of a full field of view (FOV) of each local site, which is encoded with a high fidelity compression or uncompressed, along with audio streams. However, this approach significantly increases the size of the video and audio streams transmitted from the local sites 110, 120 and 130 to the server 100, and hence requires a large network bandwidth. If the communication networks 20A, 20B and 20C do not have a sufficient network bandwidth to handle such large data amount or suffer network interruptions, the server 100 may not receive the video and audio streams from the local sites 110, 120 and 130 on time, and may not process and distribute the received video and audio streams to the local sites 110, 120 and 130 in a timely manner, causing frequent lagging or choppy images and sounds at the local sites 110, 120 and 130. Also, the server 100 may need to process more data to identify faces of the participants in each video data and perform image processing. Hence it takes longer for the server 100 to identify the participants 10, 20 and 30 at the local sites 110, 120 and 130.

To solve these technical problems, a local site (e.g., the local site 110, 120 or 130) may generate, from uncompressed video data capturing the local scene, an image or visual signature of a participant's face and generate a visual data set representing the image or visual signature. The visual data sets of the participants may then be prioritized based on various factors, for example, which participant's visual data set is more urgently required by the server 100 for remote image processing, when each participant's visual data set was previously transmitted to the server 100, whether a participant has entered or departed from the scene, etc. Hence, only a portion of the uncompressed video data that is necessary by the server 100 for remote image processing is transmitted to the server 100, which may significantly reduce a data transmission size while providing sufficient data for image processing at the server 100.

Figure 2:
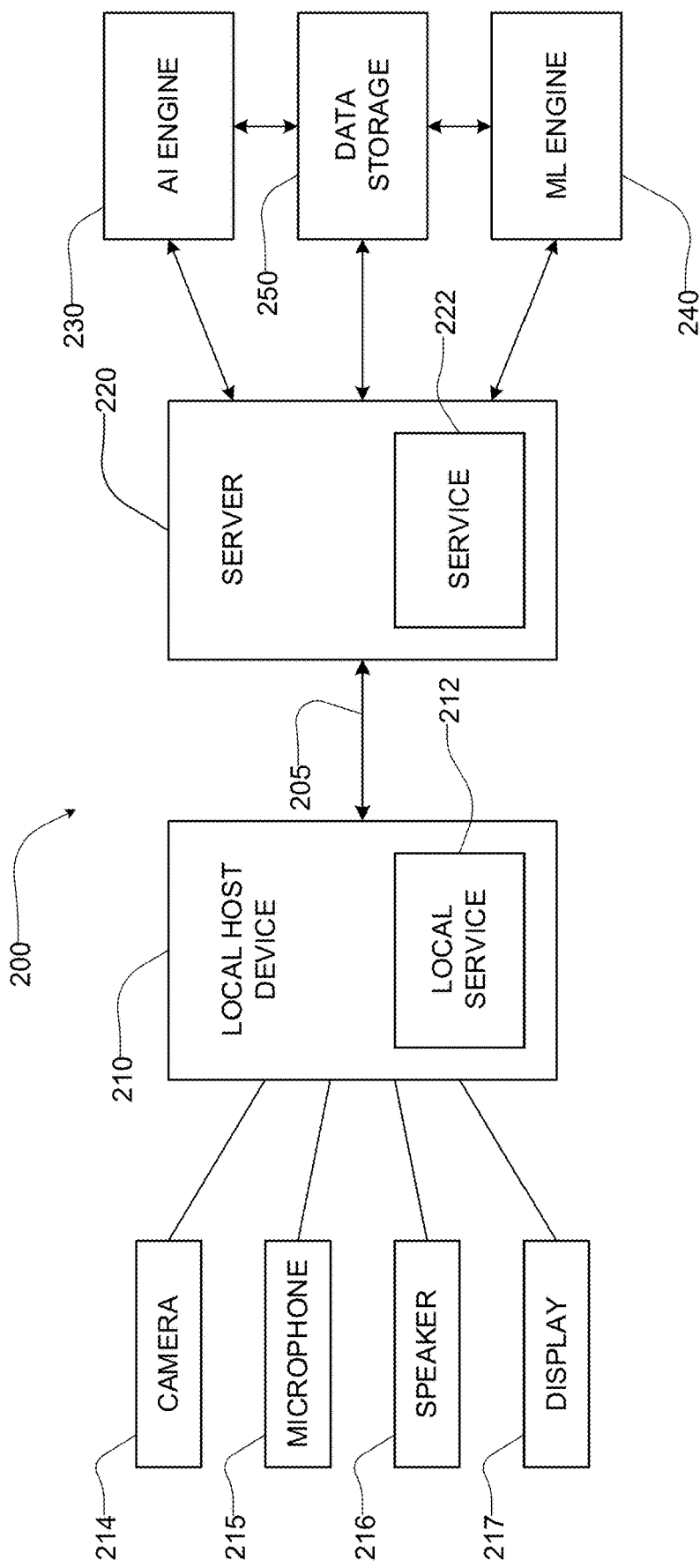
FIG. 2 illustrates an implementation of a system for generating visual data of local objects for remote image processing.

With this overview, attention is now turned to the figures to describe various implementations of the present teachings. FIG. 2 illustrates an implementation of a system 200 for generating and transmitting visual data sets for remote image processing. The system 200 may include a local host device 210, a server 220, processing resources (e.g., artificial intelligent (AI) engine 230, machine learning (ML) engine 240, etc.), data storage 250 and/or the like.

The local host device 210 is representative of any communication system, device or collection thereof, such as, a videoconferencing system, telepresence system, etc., which may include or be connected to a camera 214, microphone 215, speaker 216, display 217, etc. The local host device 210 may also be a physical or virtual computing system, device, or collection thereof, such as a smart phone, laptop computer, desktop computer, hybrid computer, tablet computer, gaming machine, smart television, entertainment device, Internet appliance, virtual machine, wearable computer, as well as any variation or combination thereof. The local host device 210 may operate remotely from the server 220, and hence may communicate with each other by way of data and information exchanged over a suitable communication network or networks 205.

The local host device 210 may host a local service 212 configured to generate, prioritize and select visual data of local participants for remote image processing by the server 220. In an implementation, the local service 212 may be implemented as part of an operating system (OS), such as Microsoft™ Windows™, Apple™ iOS™, Linux™ Google™ Chrome OS™, etc. Alternatively, the local service 212 may be implemented as a locally installed and executed application, streamed application, mobile application, or any combination or variation thereof, which may be configured to carry out operations or functions related to generating, prioritizing and selecting visual data of local participants for remote image processing by the server 220. The local service 212 may be implemented as a standalone application or may be distributed across multiple applications.

The server 220 is representative of any physical or virtual computing system, device, or collection thereof, such as, a web server, rack server, blade server, virtual machine server, or tower server, as well as any other type of computing system, which may be, in some scenarios, implemented in a data center, a virtual data center, or some other suitable facility. The server 220 may operate an image recognition service 222 (e.g., facial recognition/identity detection) which may implement all or portions of the functions to identify participants of local sites captured in video data transmitted from local sites. The service 222 may host, be integrated with, or be in communication with various data sources and processing resources such as, the data storage 250, AI engine 230, ML engine 240, etc. In some cases, the service 222 is a standalone application carrying out various operations related to image processing.

The features and functionality provided by the local service 212 and service 222 can be co-located or even integrated as a single application. In addition to the above-mentioned features and functionality available across application and service platforms, aspects of the described local visual data generation, prioritization and selection and remote image processing may be carried out across multiple devices on a same or different computing devices. For example, some functionality for the image processing may be provided by the service 222 on the server 220 and the server 220 may communicate by way of data and information exchanged between with the AI engine 230, ML engine 240, data storage 250 or other devices. As another example, the local host device 210 may operate as a so-called "thin client" in a virtual computing environment and receive video data that is to be displayed via the display 217. In this virtual computing scenario, the server 220 may carry out the entire operations of facial recognition and identity detection on objects captured in the video data.

For more accurate and relevant object recognition, various information from various sources may be searched and considered, such as the data storage 250, AI engine 230, ML engine 240, etc. For example, the system 200 may search the data collection related to the local service 212 and/or service 222, which may be stored in the local host device 210, server 220 and/or data storage 250. The system 200 may also search other data sources, such as web sites/web pages, contacts/directory, maps, user/member accounts, etc. The AI and DL engines 230 and 240 may be implemented based on a machine-learning (ML), which generally involves various algorithms that can automatically learn over time. The foundation of these algorithms is generally built on mathematics and statistics that can be employed to predict events, classify entities, diagnose problems, and model function approximations. As an example, a system can be trained to identify patterns in user activity, determine associations between various datapoints and make decisions based on the patterns and associations. Such determination may be made following the accumulation, review, and/or analysis of data from a large number of users over time, that may be configured to provide the ML algorithm (MLA) with an initial or ongoing training set.

In different implementations, a training system may be used that includes an initial ML model (which may be referred to as an "ML model trainer") configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced. The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models. For example, the ML engine 240 may be provided with directory information of an organization, which may include an image or images, name, email, phone number, network login ID, title, team, department, location, etc. of a member or non-member of the organization. From the various information, the ML engine 240 may have learned a visual signature associated with each member. Such information may then be shared with the AI engine 230 such that the system 200 can more quickly and accurately determine an identity of a person captured in the video data received from the local host device 210. The ML engine 240 may also be trained with various operations at the local sites 110, 120 and 130. For example, the ML engine 240 may be trained to identify objects from a video stream, object areas containing visual signatures of the objects, respectively, track the object areas in the video stream, identifying factors to be considered or ignored for determining a priority of each object area, processing the identified factors to determine a priority of each object area, determining data to be included in a data package transmitted to the server 100, etc.

Figure 3:
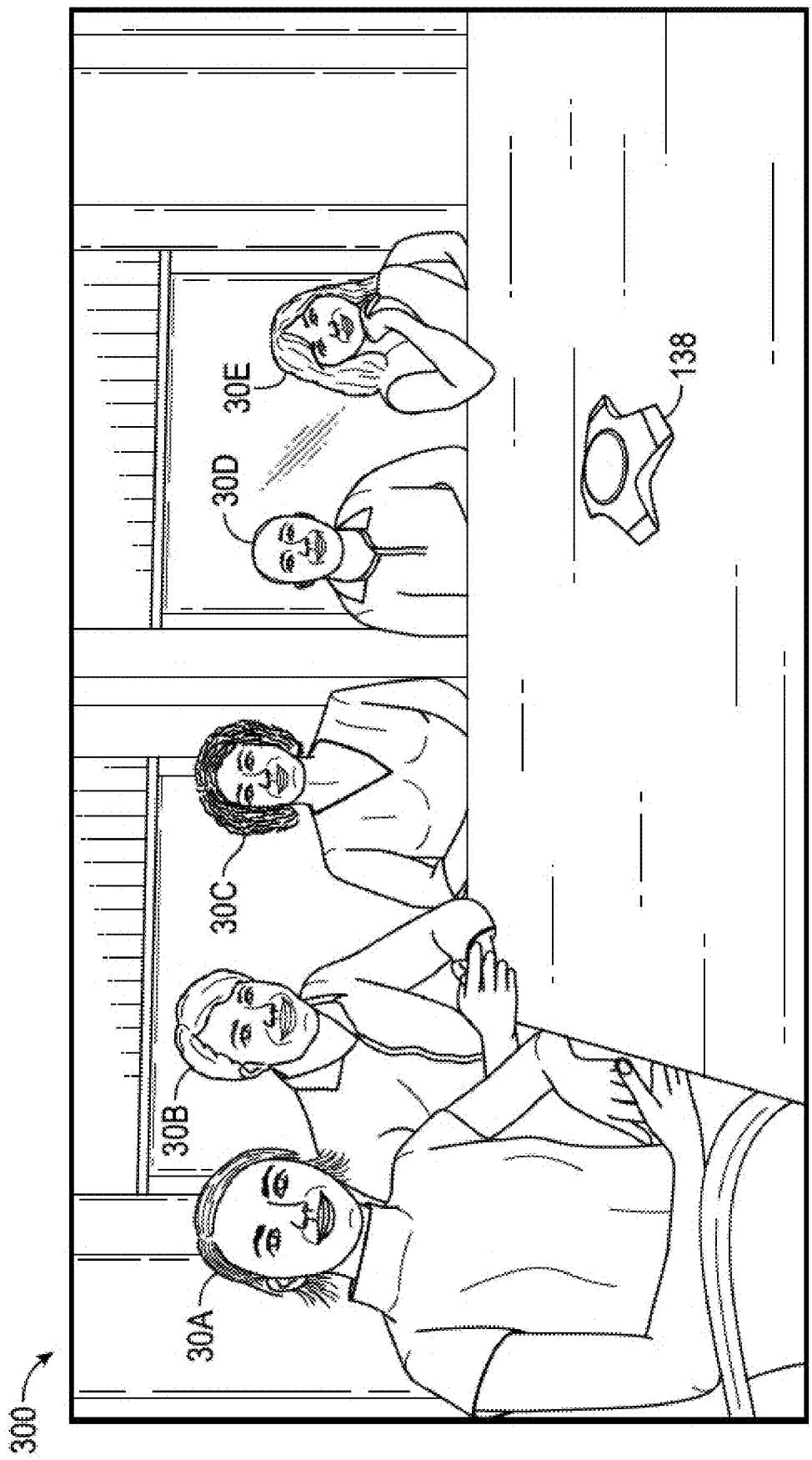
FIG. 3 illustrates an example image from a video stream capturing a local site at a time.

FIG. 3 illustrates an example video image 300 from a video stream capturing a plurality of objects, such as the participants 30A, 30B, 30C, 30D and 30E (hereinafter "participants 30") gathered at the third local site 130 for a videoconferencing session with the participants 10 and 20 at the first and second local sites 110 and 120. Although FIGS. 1 and 3 show the objects being the participants 30, the objects may be any stationary or non-stationary objects, of which an appearance can be captured by a camera. For example, the object 30 may be a pet freely moving around a room, a gate of a building, a car moving or parked at a parking lot, a painting or sculpture in a museum, etc.

The video image 300 may be from the video stream 140 captured by the camera 136 (shown in FIG. 1). In the video image 300, the participants 30 are sitting around a table and looking at the screen 134 (shown in FIG. 1) which may display video images of the first and/or second local sites 110 and 120. The camera 136 may capture the scene at the third local site 130 and transmit the video stream 140 to the local host device 132, which may be the local host device 210 shown in FIG. 2. The speaker/microphone unit 138 may be located on the table to capture speeches and sounds at the third local site 130 and generate and transmit the audio stream 150 to the local host device 132. The local host device 210 may operate the local service 212 configured to generate, prioritize and select object data for remote image processing by the server 220.

The local host device 210 may encode the video stream 140 to generate a compressed video stream for transmission to the server 220. Such compressed video stream may be distributed by the server 220 to other local sites 110 and 120 to be displayed at the display 114 at the first local site 110 and the laptop 112 at the second local site 120. The compressed video stream, however, may contain significantly less video data (e.g., pixel data) than the raw video stream 140 from the camera 136, and the server 220 may not be able to confidently recognize any visual signatures in the compressed video stream. Hence, the local host device or 210 may use the raw video stream 140 received from the camera 136 to identify the visual signature of the participants 30 and generate and transmit object data to the server 220 for remote image processing.

Figure 4:
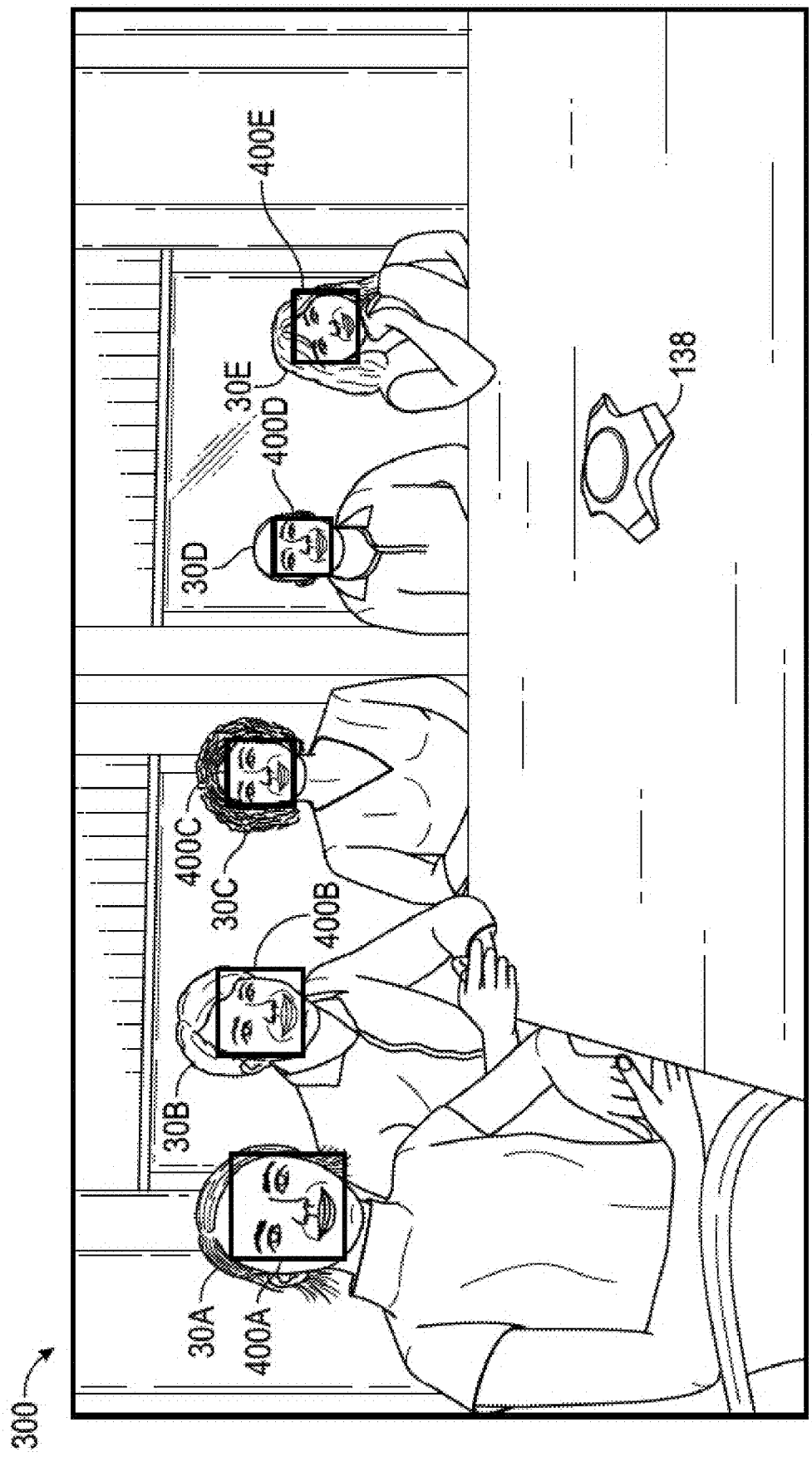
FIG. 4 illustrates example a plurality of object areas identified from the video stream.

Upon receiving the video stream 140 from the camera 136, the local host device or 210 may analyze the received video stream 140 to identify a visual signature of each participant 30. The visual signature may be any visual feature or features that can distinguish one object (or participant) from others. For example, humans have different facial features (e.g., sizes, locations, shapes, angles, colors, proportions, etc. of a nose, eyes, eye colors, lips, lip colors, eyebrows, etc.). Hence, the local host device or 210 may use one or more facial features of each participant 30 as a visual signature for each participant 30. FIG. 4 shows a plurality of object areas or facial areas 400A, 400B, 400C, 400D and 400D (hereinafter "object areas or facial areas 400") identified as visual signatures for the participants 30A, 30B, 30C, 30D and 30E, respectively. Other features may also be used as a visual signature for each object 30. For example, when the objects are pets or animals moving around, a body shape, walking pattern, proportions of body parts, etc. may be used as the visual signature to distinguish one pet from others. When the objects are cars moving in and out of a parking lot, a body shape, grill shape, headlight locations, colors, etc. of the cars may be used as the visual signature for each vehicle.

Upon identifying the object or facial areas 400, the local host device or 210 may determine a position of each participant 30 based on the video stream 140 from the camera 136, the audio stream 150 from the microphone 138, and/or the like. Using the determined locations of the participants 30, the local host device 210 may track movement of the object/facial areas 400 in the video stream 140. Such position information may also be used by the server 220 to perform facial recognition and identity detection. Hence, the local host device 210 may generate and transmit the position information to the server 220.

Figure 5:
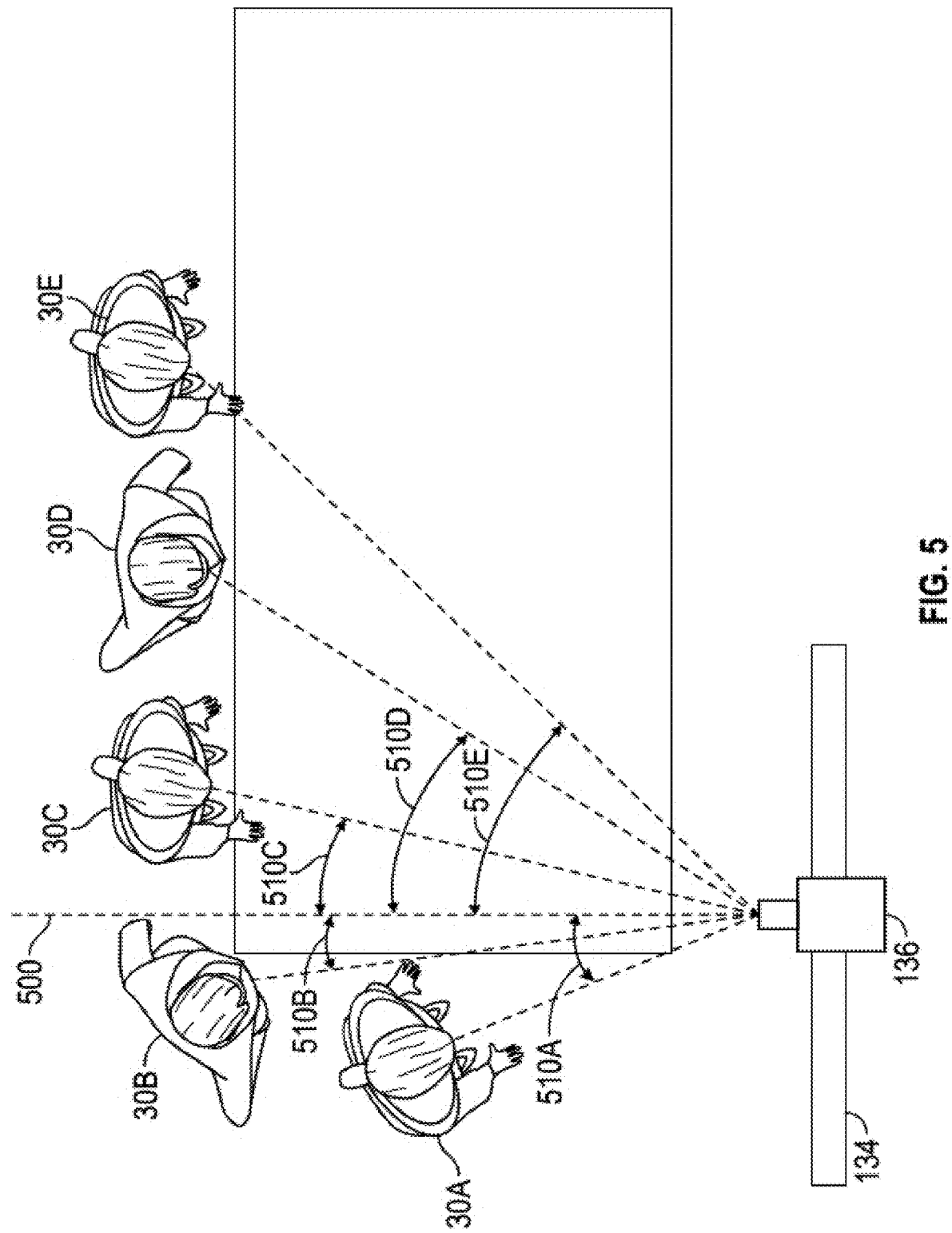
FIG. 5 illustrates an example of identifying respective positions of the objects based on the video stream.

FIG. 5 shows an example of determining respective positions of the participants 30 based on the received video stream 140. The local host device 210 may determine a line perpendicular to the camera 136 as a reference line 500. The local host device 210 may then determine, from the video stream 140, a plurality of horizontal angles or azimuths 510A, 510B, 510C, 510D and 510E between the reference line 500 and centers of the object/facial areas 400, respectively. Based on each angle 510, the local host device 210 may determine a relative location of each object/participant 30. In addition to the horizontal angles 510, the local host device 210 may determine, from the video stream 140, a plurality of vertical angles or altitudes (not shown) to obtain more precise three-dimensional positions of the object/facial areas 400.

Figure 6:
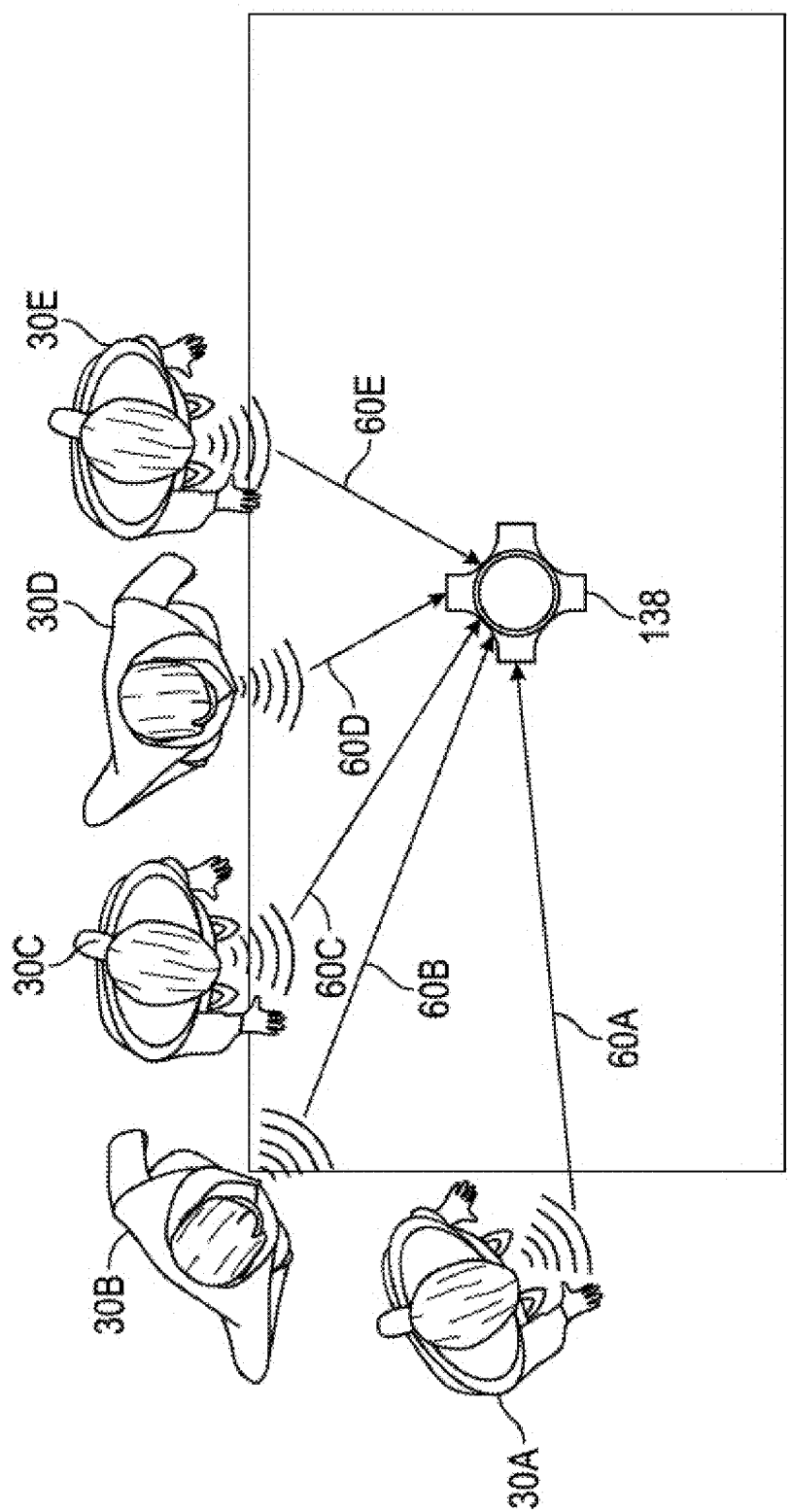
FIG. 6 illustrates an example of identifying respective positions of the objects based on an audio stream capturing the local site.

FIG. 6 illustrates an example of determining respective positions of the participants based on the audio stream 150 from the microphone 138 located on the table. The microphone 138 may capture sound beams 60A, 60B, 60C, 60D and 60E from the participants 30A, 30B, 30C, 30D and 30E, respectively, and generate spatial audio data including audio and coordinates of each of the sound beam 60A, 60B, 60C, 60D and 60E (hereinafter "sound beams 60"). Each of the sound beams 60 may be generated only when the corresponding participant 30 is speaking, and the spatial audio data may provide additional clues on a position of the participant 30 who is currently speaking. Hence, the spatial audio data may allow the local host device 210 to more accurately determine the respective positions of the participants 30, and hence may more accurately track the movements of the participants 30 in the received video stream 140. Further, the server 220 may benefit from the more accurate positions in performing object/facial recognition and identity detection.

Upon identifying the facial areas 400 from the received video stream 140, the local host device 210 may extract, based on the tracked movements of the object areas (facial areas) 400, a visual signature of each object area (facial area) 400 from the received raw video stream 140, and generate object data associated with each participant 30. For example, as shown in FIG. 7A, object data 700 may include identification (ID) data 710, visual data 712, position data 714, transmission status data 716, participant status data 718, and/or the like. The ID data 710 may be a unique identification value (e.g., a serial number, etc.), which may be generated by the local host device 210 when a visual signature of a participant 30 is identified from the received video stream 140. Hence, the ID data 710 may indicate a particular participant 30. The visual data 712 may include a visual signature (e.g., pixel data of the facial area 400, etc.) of the corresponding participant 30. The position data 714 may include the position information of each participant 30, which may be determined based on the video feed received from the camera 136 as shown in FIG. 5, the audio feed received from the microphone 138 as shown in FIG. 6, and/or the like. The transmission status data 716 may indicate whether the facial data 712 has been transmitted to the server 220. The participant status data 718 may be generated based on the received video stream 140 and indicate whether the corresponding participant 30 has newly appeared or disappeared in the received video stream 140.

Based on the object data 700, the local host device 210 may generate transmission data 720, which may contain data necessary for the server 220 to perform image processing. For example, as shown in FIG. 7B, the transmission data 720 may include the ID data 710, visual data 712, position data 714, participant status data 718, and/or the like. Upon receiving the transmission data 720, the server 220 may perform image processing (e.g., facial recognition, identity detection, etc.) to determine an identity of the visual signature expressed in the visual data 712. The position data 714 may also be used by the server 220 to determine the identity of a participant 30. For example, the server 712 may find that the visual data 712 does not provide sufficient data to confidently determine an identity associated with the visual data 712. In such case, the server 220 may determine, based on the position data 714, whether the participant 30 associated with the ID data 710 has moved away from the previous position. When the position data 714 shows no significant positional change from the previous position data, the server 220 may determine that the identity of the visual data 712 has not been changed from the previous object data even if the visual data 712 itself may not provide sufficient data. As such, the position data 714 may help the server 220 determine an identity of the visual signature expressed in the visual data 712 even when the visual data 712 is not sufficient for image recognition. Once the transmission data 720 containing the visual data 712 is transmitted to the server 220, the transmission status data 716 of the object data 700 may be updated to indicate that the visual data 712 has been transmitted to the server 220. In certain circumstances, the visual data 712 may be omitted in the transmission data 720. For example, when it is detected that a position of a particular participant 30 has not been changed, the visual data for 712 associated with the particular participant 30 may be omitted from the transmission data 720. In such case, the position data 714 associated with the particular participant 30 may be included in the transmission data 720 to allow the server 220 to update the position of the participant 30. This may further reduce an amount of data transmitted to the server 220 without hampering the facial recognition/identity detection operations by the server 220.

Upon completing image recognition to determine an identity of the visual signature expressed in the visual data 712 of the transmission data 720, the server 220 may transmit, to the local host device 210, feedback data 730. As shown in FIG. 7C, the feedback data 730 may include the ID data 710, confident value data 732, etc. The ID data 710 may be the same as the ID data 710 included in the transmission data 720. The confidence value data 732 may include a quantitative value indicating a confidence level of the identity determined based on the visual data 712 and/or other data contained in the transmission data 720. When an object's visual signature is not clearly captured in the visual data 712, the server 220 may include, in the confidence value data 732, a value (e.g., 13%) or description (e.g., low confidence) indicating that the identity of the participant 30 determined based on the visual data 712 has a low confidence value. When an object's visual signature is clearly captured in the visual data 712, the server 220 may include, in the confidence value data 732, a value or description indicating that the identity of the participant 30 determined based on the visual data 712 has a high confidence value.

Figure 7D:
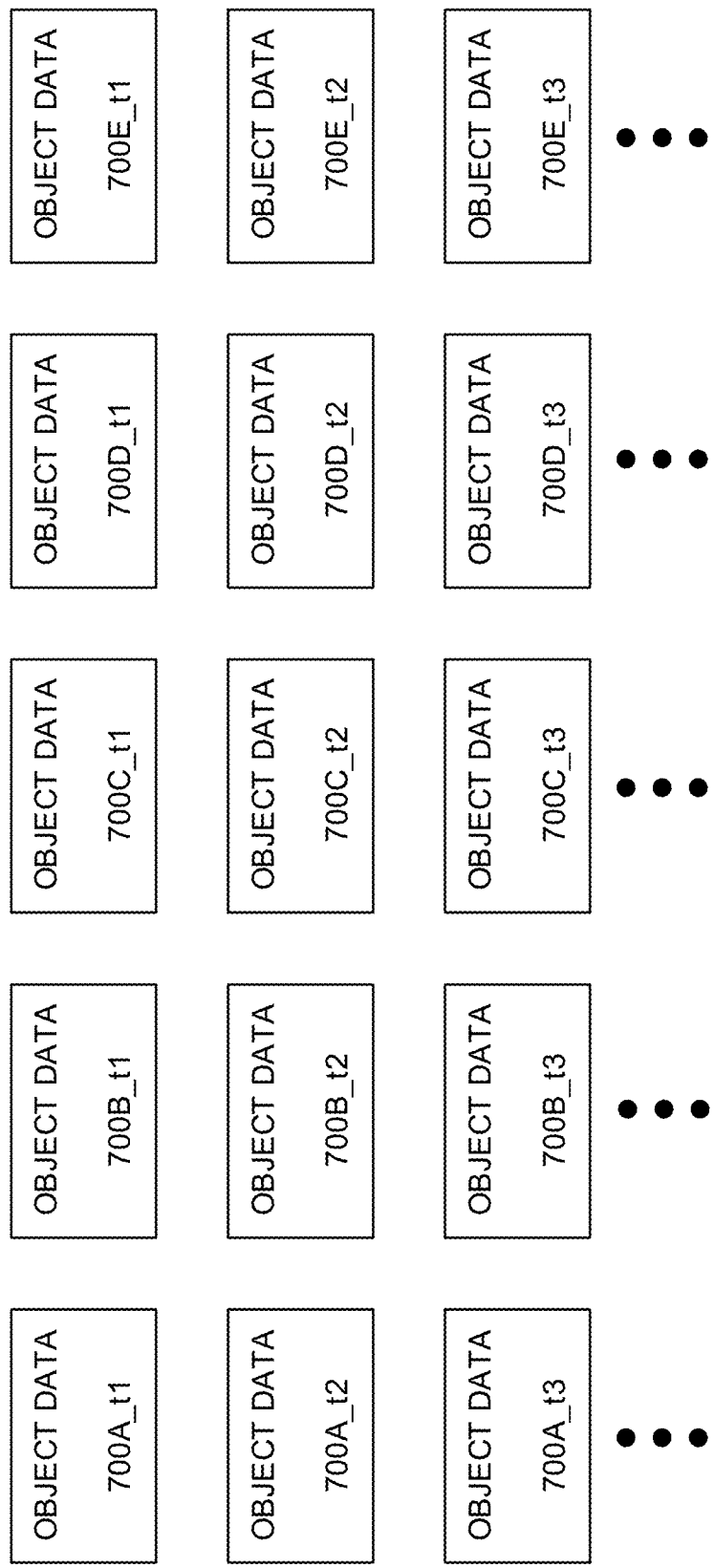
FIG. 7D illustrates example object data sets generated at a different time, respectively, each object data set including a plurality of object data associated with the plurality of objects, respectively.

The local host device 210 may continuously generate, based on the video stream 140, audio stream 150, etc., a set of object data for each object (or participant) 30. For example, as shown in FIG. 7D, the local host device 210 may generate, at a time t1, a set of object data 700A_t1, 700B_t1, 700C_t1, 700D_t1 and 700E_t1, which correspond to the participants 30A, 30B, 30C, 30D and 30E, respectively. The local host device 210 may generate, at a subsequent time t2, another set of object data 700A_t2, 700B_t2, 700C_t2, 700D_t2 and 700E t2, which correspond to the participants 30A, 30B, 30C, 30D and 30E, respectively. At another time t3 which is later than the time t2, the local host device 210 may generate another set of object data 700A_t3, 700B_t3, 700C_t3, 700D_t3 and 700E_t3, which correspond to the participants 30A, 30B, 30C, 30D and 30E, respectively. As such, the local host device 210 may continue to generate a set of object data 700 at different times.

While each object data set may be based on each object's visual signature in the same frame of a video stream provided by the same source (e.g., camera 136), the object data sets may be generated based on visual data from different fames or different video streams provided by different sources. For example, an object data set may include object data based on images from two or more video streams captured by two or more cameras. Also, object data for a particular object may be generated based on images from two different video frames captured by the same camera or captured by two different cameras.

Based on the set of object data generated at each time, the local host device 210 may generate and transmit a set of transmission data 720. For example, as shown in FIG. 7E, based on a set of object data generated at a time t(n), the local host device 210 may generate and transmit, to the server 220, a set of transmission data 720A_t(n), 720B_t(n), 720C_t(n), 720D_t(n), and 720E_t(n) corresponding to the participants 30A, 30B, 30C, 30D and 30E, respectively. Upon receiving the set of transmission data, as shown in FIG. 7F, the server 220 may generate and transmit, to the local host device 210, a set of feedback data 730A_t(n), 730B_t(n), 730C_t(n), 730D_t(n), and 730E_t(n), which correspond to 720A_t(n), 720B_t(n), 720C_t(n), 720D_t(n), and 720E_t(n), respectively. As shown in FIG. 7C, each feedback data may include the confidence value data 732. For example, as shown in FIG. 7F, the set of feedback data 730A_t(n), 730B_t(n), 730C_t(n), 730D_t(n), and 730E_t(n) may include confidence values, (e.g., 78% confidence, 84% confidence, 47% confidence, 65% confidence and 18% confidence, respectively.

Based on the confidence values included in the set of feedback data 730A_t(n), 730B_t(n), 730C_t(n), 730D_t(n), the local host device 210 may determine a priority of a subsequent set of transmission data 720A_t(n+1), 720B_t(n+1), 720C_t(n+1), 720D_t(n+1) and 720E_t(n+1). The local host device 210 may also determine whether the entire transmission data set or only some of the transmission data set needs to be transmitted to the server 220, based on, for example, available bandwidth/congestion information of the communication network or network works 205. For example, in FIG. 7F, the feedback data 730B_t(n) indicates that the confidence value of the visual data 712 contained in the transmission data 720B_t(n) is 84%, which indicates that the identity determined based on the visual data 712 contained in the transmission data 720B_t(n) is very likely to be accurate. In such case, it may be assumed that the identity of the participant 30B (corresponding to the transmission data 720B_t(n)) has been accurately determined, and the server 220 may not need to receive any further transmission data containing the visual data 712 of the participant 30B until the participant 30B changes its position or disappear from the video stream 140. Hence, the subsequent transmission data 720B_t(n+1) may be given a low priority.

On other hand, the feedback data 730E_t(n) indicates that the confidence value of the visual data 712 contained in the transmission data 720E_t(n) is 18%, which indicates that the identity determined based on the visual data 712 contained in the transmission data 720E_t(n) is very unlikely to be accurate. In such case, the server 220 may need to receive the visual data 712 associated with the object area 400E more frequently to determine the identity of the participant 30E. Hence, the subsequent transmission data 720E_t(n+1) may be given a highest priority. As such, based on the confidence value data 732 contained in the set of feedback data 730A_t(n), 730B_t(n), 730C_t(n), 730D_t(n) and 730E_t(n), the subsequent set of transmission data 720A_t(n+1), 720B_t(n+1), 720C_t(n+1), 720D_t(n+1) and 720E_t(n+1) may be prioritized. FIG. 7G shows the subsequent set of transmission data arranged in an order of the determined priority (i.e., transmission data 720E_t(n+1), transmission data 720C_t(n+1), transmission data 720D_t(n+1), transmission data 720A_t(n+1) and transmission data 720B_t(n+1)).

Initially, the server 220 may need to receive the visual data 712 of all object areas 400 for a number of cycles to determine an identity associated with each object area 400. However, once the identity for each object area 400 has been determined, the server 220 may no longer need to receive the visual data 712 of all object areas 400. Hence, the local host device may not generate or transmit the transmission data 720 for some object areas 400 to the server 220. For example, in FIG. 7F, the feedback data 730A_t(n), 730B_t(n) and 730D_t(n) contain high confidence values (e.g., 78%, 84% and 65%). Hence, the local host device 210 may not generate or transmit the subsequent transmission data 720A_t(n), 70B_t(n) and 720D_t(n) to the server 220.

Since the facial areas 400 are extracted from the uncompressed raw video stream 140 received from the camera 136, each extracted facial area 400 may contain sufficient data describing or representing the visual signature of each participant 30. Also, as the extracted facial areas 400 may occupy a very small fraction of the entire area of the captured scene, an amount of the visual data 712 may be significantly reduced, eliminating a need for a high bandwidth network and avoiding causing transmission congestions or interruptions. Therefore, this description provides technical solutions to the technical problem that a large network bandwidth is required to transmit the uncompressed raw video stream for remote image processing.

Figure 8A:
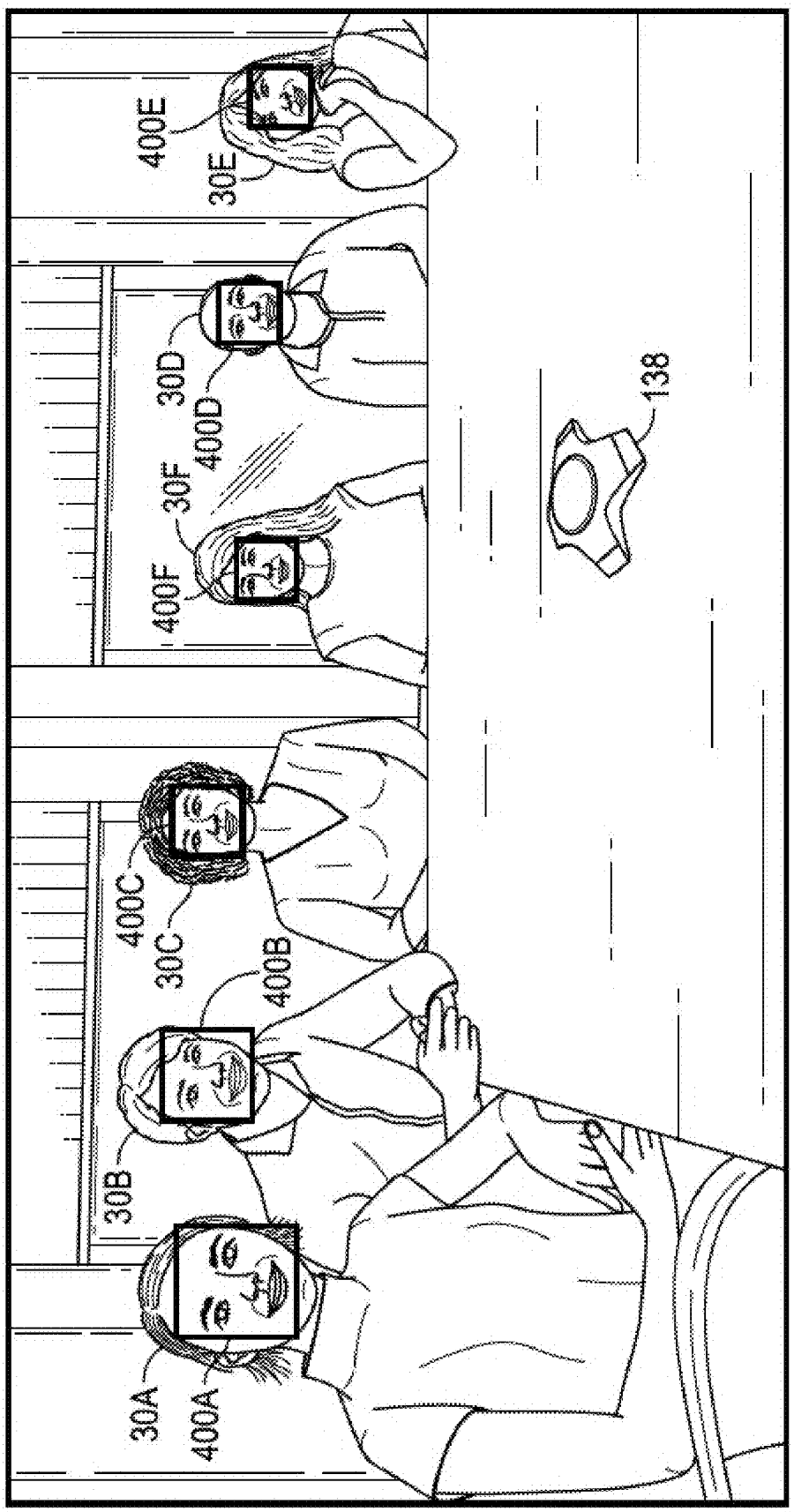
FIG. 8A illustrates another example video image from the video stream at a different time.

During the videoconference, a new participant may walk into the conference room and join the ongoing videoconferencing, or one of the participants 30 may leave the conference room before the videoconference is finished. Such a change in participants may require the server 220 to determine an identity of the newly joined participant or the participant who left the videoconferencing. For example, as shown in FIG. 8A, a new participant 30F may walk into the conference room and sit between the participants 30C and 30D. In such case, the local host device 210 may determine an object area or facial area 400F of the new participant 30F and generate visual data containing a visual signature of the object area 400F. Once the visual data is generated, the local host device 210 may transmit, to the server 220, transmission data including the visual data. In doing so, the transmission data associated with the new participant 30F may be given a highest priority even though no feedback has been provided from the server 220 in order to make the server 220 recognize the new participant 30F as soon as possible and have the server 220 prioritize determining an identity of the new participant 30F. For example, FIG. 8B shows a set of transmission data 720E_t(m), 720C_t(m) and 720D_t(m) containing visual data 712 of the object areas 400E, 400C and 400D, respectively, which are generated at a time t(m). FIG. 8C shows a set of feedback data 730E_t(m), 730C_t(m) and 730D_t(m) containing confidence values 24%, 37% and 85% for the visual data 712 contained in the set of transmission data 720E_t(m), 720C_t(m) and 720D_t(m), respectively. Based on the feedback data 730E_t(m), 730C_t(m) and 730D_t(m), the local host device 210 may prioritize a subsequent transmission data set in an order of transmission data 720E_t(m+1), transmission data 720C_t(m_1) and transmission data 720D_t(m_1). Due to the high confidence value (e.g., 85%) in the feedback data 730D_t(m), the local host device 210 may determine that subsequent transmission data 720D_t(m+1) may not need to be generated or transmitted to the server 220. Further, upon identifying the new participant 30F from the received video stream 140, the local host device 210 may generate new transmission data 720F t(n+1) containing visual data 712 representing a visual signature of the object area 30F. Since the object area 30F has been newly identified, the transmission data 720F t(n+1) may be given a higher or the highest priority and included in a subsequent set of transmission data 720F t(n+1), 720E_t(n+1) and 720C_t(n+1), as shown in FIG. 8D. As such, a set of transmission data 720 may be prioritized further based on identifying a new object in the video stream 140.

Based on the tracked movement of each object area 400, the local host device 210 may be able to detect that one of the participants 30 has left the conference room before the videoconferencing session is finished. In such case, the local host device 210 may update the object data 718 to indicate that the corresponding object is no longer present and may include the updated object data 718 in a subsequent set of transmission data 720. Upon receiving the updated object data 718, the server 220 may generate a participant status change message specifying an identity of the participant 30 who has left the conference room, which may be transmitted to and displayed at the first and second local sites 110 and 120.

The local host device 210 may also regularly check the last time the transmission data 720 associated with each object area 400 was transmitted to the server 220. When a predetermined period of time has passed since the last time the transmission data 720 has been transmitted to the server 220, the local host device 210 may generate and transmit, to the server 220, new transmission data 720 containing most recent visual data 712 to have the server 220 determine an identity based on the most recent visual data 712. This may prevent the server 220 from failing to notice changes to a makeup of the participants 30 and from generating an incorrect identification of participants 30. For example, as shown in FIG. 9A, a set of transmission data 720C_t(1) and 720D_t(1), which contains the visual data 712 of the object areas 400C and 400D captured at a time 41), may be transmitted to the server 220. In turn, as shown in FIG. 9B, the server 220 may transmit, to the local host device 210, a set of feedback data 730C_t(1) and 730D_t(1). Based on the received feedback data 730C_t(1) and 730D_t(1), the local host device 210 may include transmission data 720C_t(l+1) and 720D_t(l+1) in a subsequent transmission data set 720. The local host device 210 may also determine, based on the transmission status data 716 (shown in FIG. 7A) of previous object data 710, that the transmission data 720 for the object areas 400B, 400E and 400F has not been transmitted for longer than a predetermined time period (e.g., 60 seconds). The local host device 210 may then generate and include transmission data 720B_t(l+1), 720E_t(l+1) and 720_(l+1) in the subsequent transmission data set 720, as shown in FIG. 9C.

Figure 10:
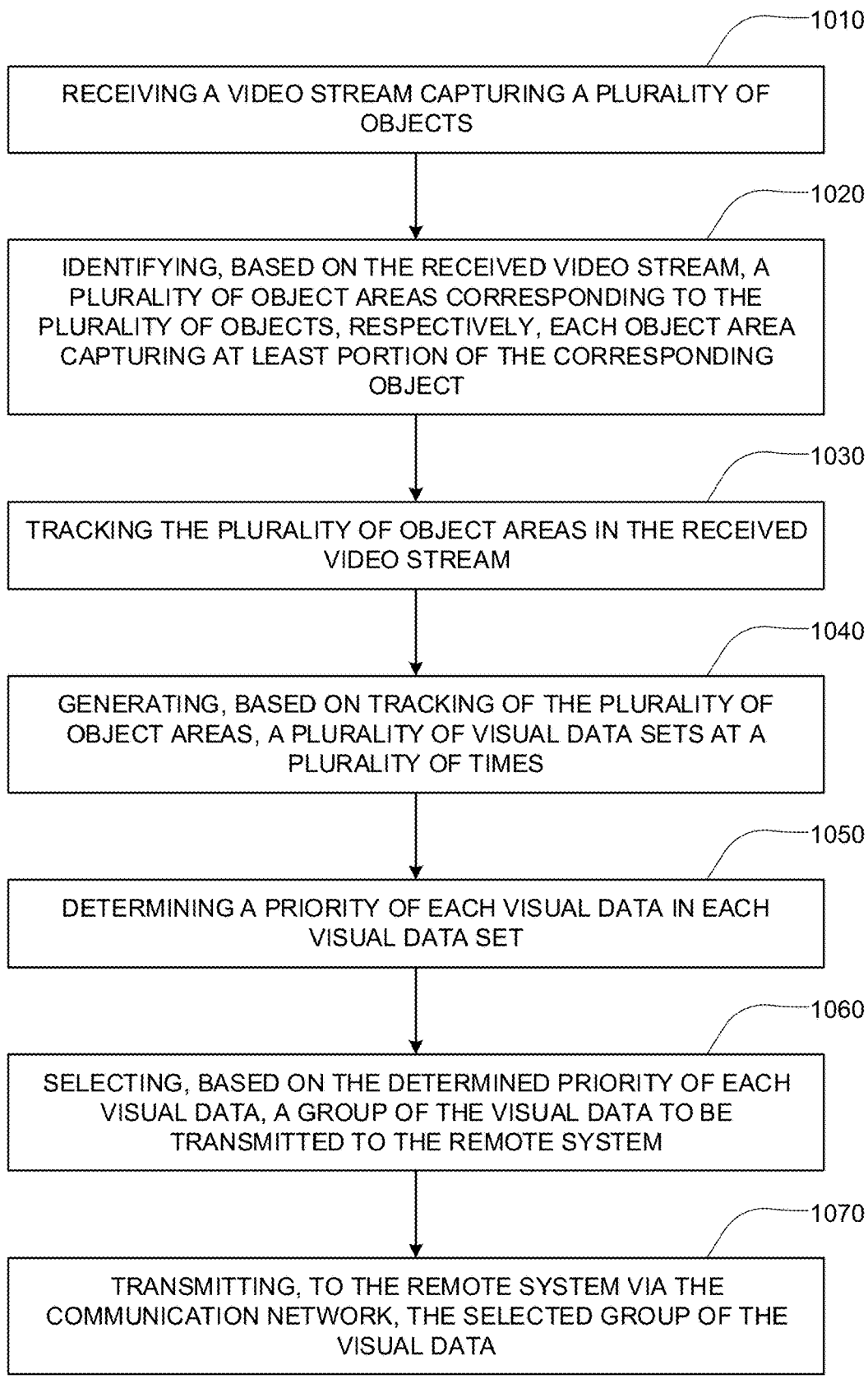
FIG. 10 is a flow diagram showing operations by a local host device to generate visual data set for remote image processing.

FIG. 10 is a flow diagram showing operations for transmitting visual data to a remote system. With reference to the preceding figures, at step 1010, a video stream (e.g., video stream 140 shown in FIG. 1) capturing a plurality of objects (e.g., participants 30 shown in FIG. 3) may be received. At step 1020, based on the received video stream, a plurality of object areas (e.g., object areas 400 shown in FIG. 4) may be identified. The plurality of object areas may correspond to the plurality of objects, respectively. Each object area may capture at least a portion (e.g., facial area) of the corresponding object. At step 1030, the plurality of object areas may be tracked in the received video stream. At step 1040, based on tracking of the plurality of object areas, a plurality of visual data sets may be generated at a plurality of times. Each visual data set may be generated at a different time and includes visual data (e.g., visual data 712 shown in FIG. 7A) representing each object area. At step 1050, in each visual data set, a priority of each visual data may be determined based on, for example, a confidence value of the visual data presenting a same object area of a previous time, a most recent time of transmitting the visual data representing a same object area to a remote system (e.g., server 220 shown in FIG. 2) via a communication network, a new object in the received video stream, and/or the like. At step 1060, based on the determined priority of each visual data and other factors (e.g., an available bandwidth or constrains of the communication network or network 205, etc.), a group of the visual data to be transmitted to the remote system may be selected. At step 1070, the selected group of the visual data may be transmitted to the remote system via the communication network. Accordingly, only a portion of the received video stream may be transmitted to the remote system for remote image processing, thereby significantly reducing an amount of data that needs to be transmitted to the remote system while providing sufficient data for the remote system to determine an identity of each object through image processing. Hence, the description provides technical solutions to the technical problems that a large amount of data needs to be transmitted to a remote system in order to allow the remote system to perform image processing to determine an identity of each object in a received video stream.

Figure 11:
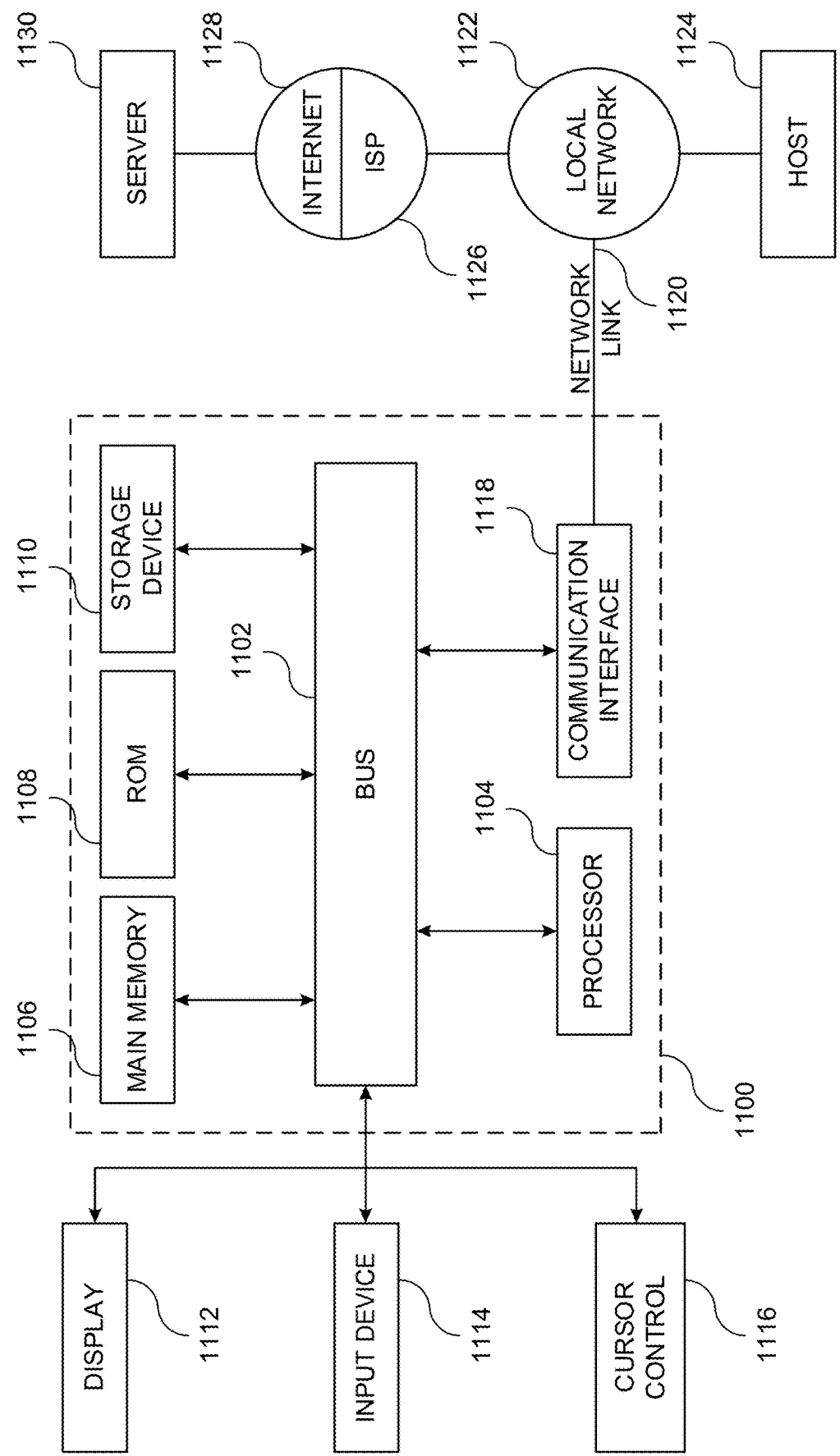
FIG. 11 is a block diagram showing an example computer system upon which aspects of this disclosure may be implemented.

FIG. 11 is a block diagram showing an example a computer system 1100 upon which aspects of this disclosure may be implemented. The computer system 1100 may include a bus 1102 or other communication mechanism for communicating information, and a processor 1104 coupled with the bus 1102 for processing information. The computer system 1100 may also include a main memory 1106, such as a random-access memory (RAM) or other dynamic storage device, coupled to the bus 1102 for storing information and instructions to be executed by the processor 1104. The main memory 1106 may also be used for storing temporary variables or other intermediate information during execution of instructions to be executed by the processor 1104. The computer system 1100 may implement, for example, the local host device 210 and server 220.

The computer system 1100 may further include a read only memory (ROM) 1108 or other static storage device coupled to the bus 1102 for storing static information and instructions for the processor 1104. A storage device 1110, such as a flash or other non-volatile memory may be coupled to the bus 1102 for storing information and instructions.

The computer system 1100 may be coupled via the bus 1102 to a display 1112, such as a liquid crystal display (LCD), for displaying information. One or more user input devices, such as the example user input device 1114 may be coupled to the bus 1102, and may be configured for receiving various user inputs, such as user command selections and communicating these to the processor 1104, or to the main memory 1106. The user input device 1114 may include physical structure, or virtual implementation, or both, providing user input modes or options, for controlling, for example, a cursor, visible to a user through display 1112 or through other techniques, and such modes or operations may include, for example virtual mouse, trackball, or cursor direction keys.

The computer system 1100 may include respective resources of the processor 1104 executing, in an overlapping or interleaved manner, respective program instructions. Instructions may be read into the main memory 1106 from another machine-readable medium, such as the storage device 1110. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1110. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1100 may also include a communication interface 1118 coupled to the bus 1102, for two-way data communication coupling to a network link 1120 connected to a local network 1122. The network link 1120 may provide data communication through one or more networks to other data devices. For example, the network link 1120 may provide a connection through the local network 1122 to a host computer 1124 or to data equipment operated by an Internet Service Provider (ISP) 1126 to access through the Internet 1128 a server 1130, for example, to obtain code for an application program.

In the following, further features, characteristics and advantages of the invention will be described by means of items:

Item 1. A system for transmitting object visual data for remote image processing, comprising a processor and a computer-readable medium in communication with the processor. The computer-readable medium comprising instructions that, when executed by the processor, cause the processor to control the system to perform receiving a video stream capturing a plurality of objects; identifying, based on the received video stream, a plurality of object areas corresponding to the plurality of objects, respectively, each object area capturing at least a portion of the corresponding object; tracking the plurality of object areas in the received video stream; generating, based on the tracking of the plurality of object areas, a plurality of visual data sets at a plurality of times, wherein each visual data set is generated at a different time and includes visual data representing each object area; determining a priority of each visual data in each visual data set based on at least one of a confidence value of the visual data presenting a same object area of a previous time, the confidence value received from the remote system via a communication network; a most recent time of transmitting the visual data representing a same object area to the remote system via the communication network; and a new object in the received video stream; selecting, based on the determined priority of each visual data, a group of the visual data to be transmitted to the remote system; and transmitting, to the remote system via the communication network, the selected group of the visual data.

Item 2. The system of Item 1, wherein the received video stream is an uncompressed video stream.

Item 3. The system of any of Items 1 and 2, wherein the plurality of objects comprises a plurality of persons, and each object area comprises a facial area respectively of each person.

Item 4. The system of any of Items 1 to 3, wherein the instructions, when executed by the processor, further cause the processor to control the system to perform determining, based on the received video stream, a position of each object; and transmitting, to the remote system via the communication network, the determined position of each object along with the visual data.

Item 5. The system of any of Items 1 to 4, wherein the instructions, when executed by the processor, further cause the processor to control the system to perform receiving an audio stream capturing the plurality of objects; determining, based on the received audio stream, a position of each object; and transmitting, to the remote system via the communication network, the determined position of each object along with the visual data.

Item 6. The system of any of Items 1 to 5, wherein the remote system comprises an image processing system configured to determine an identity of each object based on the visual data transmitted to the remote system, and the confidence value indicates a confidence level of the identity determined by the image processing system based on the visual data transmitted to the remote system.

Item 7. The system of any of Items 1 to 6, wherein, for selecting the group of the visual data to be transmitted to the remote system, the instructions, when executed by the processor, further cause the processor to control the system to perform selecting the group of the visual data to be transmitted to the remote system based on the confidence value.

Item 8. The system of any of Items 1 to 7, wherein, for selecting the group of the visual data to be transmitted to the remote system, the instructions, when executed by the processor, further cause the processor to control the system to perform selecting the group of the visual data to be transmitted to the remote system based on bandwidth information of the communication network.

Item 9. The system of any of Items 1 to 8, wherein the remote system comprises a videoconferencing host server, and the instructions, when executed by the processor, further cause the processor to control the system to perform compressing the received video stream; and transmitting, to the remote system via the communication network, the compressed video stream.

Item 10. A non-transitory computer-readable medium comprising instructions that, when executed by a processor, cause the processor to control a system to perform receiving a video stream capturing a plurality of objects; identifying, based on the received video stream, a plurality of object areas corresponding to the plurality of objects, respectively, each object area capturing at least a portion of the corresponding object; tracking the plurality of object areas in the received video stream; generating, based on the tracking of the plurality of object areas, a plurality of visual data sets at a plurality of times, wherein each visual data set is generated at a different time and includes visual data representing each object area; determining a priority of each visual data in each visual data set based on at least one of a confidence value of the visual data presenting a same object area of a previous time, the confidence value received from the remote system via a communication network; a most recent time of transmitting the visual data representing a same object area to the remote system via the communication network; and a new object in the received video stream; selecting, based on the determined priority of each visual data, a group of the visual data to be transmitted to the remote system; and transmitting, to the remote system via the communication network, the selected group of the visual data.

Item 11. A method of operating a system for transmitting visual data to a remote system, comprising receiving a video stream capturing a plurality of objects; identifying, based on the received video stream, a plurality of object areas corresponding to the plurality of objects, respectively, each object area capturing at least a portion of the corresponding object; tracking the plurality of object areas in the received video stream; generating, based on tracking of the plurality of object areas, a plurality of visual data sets at a plurality of times, wherein each visual data set is generated at a different time and includes visual data representing each object area; determining a priority of each visual data in each visual data set based on at least one of a confidence value of the visual data presenting a same object area of a previous time, the confidence value received from the remote system via a communication network; a most recent time of transmitting the visual data representing a same object area to the remote system via the communication network; and a new object in the received video stream; selecting, based on the determined priority of each visual data, a group of the visual data to be transmitted to the remote system; and transmitting, to the remote system via the communication network, the selected group of the visual data.

Item 12. The method of Item 11, wherein the received video stream is an uncompressed video stream.

Item 13. The method of any of Items 11 and 12, wherein the plurality of objects comprises a plurality of persons, and each object area comprises a facial area respectively of each person.

Item 14. The method of any of Items 11 to 13, further comprising determining, based on the received video stream, a position of each object; and transmitting, to the remote system via the communication network, the determined position of each object along with the visual data.

Item 15. The method of any of Items 11 to 14, further comprising receiving an audio stream capturing the plurality of objects; determining, based on the received audio stream, a position of each object; and transmitting, to the remote system via the communication network, the determined position of each object along with the visual data.

Item 16. The method of any of Items 11 to 15, wherein the remote system comprises an image processing system configured to determine an identity of each object based on the visual data transmitted to the remote system, and the confidence value indicates a confidence level of the identity determined by the image processing system based on the visual data transmitted to the remote system.

Item 17. The method of any of Items 11 to 16, wherein selecting the group of the visual data to be transmitted to the remote system comprises selecting the group of the visual data to be transmitted to the remote system based on the confidence value.

Item 18. The method of any of Items 11 to 17, wherein selecting the group of the visual data to be transmitted to the remote system comprises selecting the group of the visual data to be transmitted to the remote system based on bandwidth information of the communication network.

Item 19. The method of any of Items 11 to 18, wherein the remote system comprises a videoconferencing host server, and the method further comprises compressing the received video stream; and transmitting, to the remote system via the communication network, the compressed video stream.

Item 20. The method of any of Items 11 to 19, further comprising generating an identification for each identified object area, wherein the identification is transmitted along with the visual data to the remote system via the communication network.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for reducing an amount of data transmitted to a remote system for remote image processing to identify a plurality of objects in a scene, the system comprising:
   a processor; and a non-transitory computer-readable medium in communication with the processor, the computer-readable medium comprising instructions that, when executed by the processor, cause the processor to control the system to perform functions of:
  receiving a video stream capturing the scene including the plurality of objects that are independently movable;
  identifying, within the scene captured in the received video stream, a plurality of object areas respectively corresponding to the plurality of objects, each object area capturing a visual feature of the corresponding object;
  tracking the plurality of object areas within the scene captured in the received video stream over a time;
  generating, based on the tracking of the plurality of object areas, a plurality of visual data sets respectively representing visual characteristics of the plurality of object areas in the scene captured, wherein generating the plurality of visual data sets is repeated at a plurality of different times such that the plurality of visual data sets is newly generated at each different time to respectively represent the visual characteristics of the plurality of object areas in the scene captured at each different time; and
  in response to the plurality of visual data sets being newly generated at each different time, performing functions of:
    determining a transmission priority of each newly generated visual data set based on at least one of:
      a confidence value of each visual data set previously transmitted to the remote system via a communication network, the confidence value determined by the remote system and indicating a confidence level of an identity of the object corresponding to the object area represented by each newly generated visual data set;
      a most recent time that the visual data set representing each object area has been transmitted to the remote system for the remote image processing; and
      an occurrence of a new object area due to a new object appearing in the scene captured in the received video stream;
    determining, based on the transmission priority of each newly generated visual data set, whether each newly generated visual data set needs to be included in a subset for transmission to the remote system for the remote image processing, the subset including less than all of the plurality of newly generated visual data sets; and
    transmitting, to the remote system via the communication network, only the subset for the remote image processing to remotely identify, at the remote system, the object corresponding to each visual data set included in the transmitted subset.

2. The system of claim 1, wherein:
the received video stream is an uncompressed video stream; and
the plurality of visual data sets is extracted from the uncompressed video stream.

3. The system of claim 1, wherein the plurality of objects comprises a plurality of persons, and each object area captures a facial features respectively of each person.

4. The system of claim 1, wherein the instructions, when executed by the processor, further cause the processor to control the system to perform functions of:
  determining, based on the received video stream, a position of each object; and
  transmitting, to the remote system via the communication network, the determined position of each object along with the visual data set corresponding to each object.

5. The system of claim 1, wherein the instructions, when executed by the processor, further cause the processor to control the system to perform functions of:
  receiving an audio stream capturing sounds from the plurality of objects;
  determining, based on the received audio stream, a position of each object; and
  transmitting, to the remote system via the communication network, the determined position of each object along with the visual data set corresponding to each object.

6. The system of claim 1, wherein, for determining whether each newly generated visual data set needs to be included in the subset for transmission to the remote system, the instructions, when executed by the processor, further cause the processor to control the system to perform a function of determining whether each newly generated visual data set needs to be included in the subset further based on bandwidth information of the communication network.

7. The system of claim 1, wherein:
the remote system comprises a videoconferencing host server, and
the instructions, when executed by the processor, further cause the processor to control the system to perform functions of:
  compressing the received video stream; and
  transmitting, to the remote system via the communication network, the compressed video stream along with the subset.

8. The system of claim 1, wherein, for generating the plurality of visual data sets, the instructions, when executed by the processor, further cause the processor to control the system to perform a function of generating the plurality of visual data sets respectively representing the plurality of object areas in the scene captured at a same time.

9. The system of claim 1, wherein:
the plurality of object areas comprises first and second object areas respectively corresponding to first and second objects,
the plurality of visual data sets previously transmitted to the remote system comprises first and second previously transmitted visual data sets respectively corresponding to the first and second object areas, the first previously transmitted visual data set having the confidence value higher than that of the second previously visual data sets,
the plurality of newly generated visual data sets comprises first and second newly generated visual data sets respectively corresponding to the first and second object areas, and
for determining the transmission priority of each newly generated visual data set, the instructions, when executed by the processor, further cause the processor to control the system to perform a function of setting the transmission priority of the first newly generated visual data to be lower than that of the second newly generated object area.

10. The system of claim 1, wherein:
the plurality of object areas comprises first and second object areas respectively corresponding to first and second objects, the plurality of visual data sets previously transmitted to the remote system comprises first and second previously transmitted visual data sets respectively corresponding to the first and second object areas, the first previously transmitted visual data set being transmitted prior to transmitting the second previously visual data sets, the plurality of newly generated visual data sets comprises first and second newly generated visual data sets respectively corresponding to the first and second object areas, and for determining the transmission priority of each newly generated visual data set, the instructions, when executed by the processor, further cause the processor to control the system to perform a function of setting the transmission priority of the first newly generated visual data to be higher than that of the second newly generated object area.

11. A method of reducing an amount of data transmitted to a remote system for remote image processing to identify a plurality of objects in a scene, the method comprising:

receiving a video stream capturing the scene including the plurality of objects that are independently movable;

identifying, within the scene captured in the received video stream, a plurality of object areas respectively corresponding to the plurality of objects, each object area capturing a visual feature of the corresponding object;

tracking the plurality of object areas within the scene captured in the received video stream over a time;

generating, based on the tracking of the plurality of object areas, a plurality of visual data sets respectively representing visual characteristics of the plurality of object areas in the scene captured, wherein generating the plurality of visual data sets is repeated at a plurality of different times such that the plurality of visual data sets is newly generated at each different time to respectively represent the visual characteristics of the plurality of object areas in the scene captured at each different time; and in response to the plurality of visual data sets being newly generated at each different time, performing steps of:

determining a transmission priority of each newly generated visual data set based on at least one of:

a confidence value of each visual data set previously transmitted to the remote system via a communication network, the confidence value determined by the remote system and indicating a confidence level of an identity of the object corresponding to the object area represented by each newly generated visual data set;

a most recent time that the visual data set representing each object area has been transmitted to the remote system for the remote image processing; and an occurrence of a new visual area due to a new object appearing in the scene captured in the received video stream;

determining, based on the transmission priority of each newly generated visual data set, whether each newly generated visual data set needs to be included in a subset for transmission to the remote system for the remote image processing, the subset including less than all of the plurality of newly generated visual data sets; and transmitting, to the remote system via the communication network, only the subset for the remote image processing to remotely identify, at the remote system, the object corresponding to each visual data set included in the transmitted subset.

12. The method of claim 11, wherein:
the received video stream is an uncompressed video stream; and
the plurality of visual data sets is extracted from the uncompressed video stream.

13. The method of claim 11, the plurality of objects comprises a plurality of persons, and each object area captures a facial features respectively of each person.

14. The method of claim 11, further comprising:
determining, based on the received video stream, a position of each object; and
transmitting, to the remote system via the communication network, the determined position of each object along with the visual data set corresponding to each object.

15. The method of claim 11, further comprising:
receiving an audio stream capturing sounds from the plurality of objects;
determining, based on the received audio stream, a position of each object; and
transmitting, to the remote system via the communication network, the determined position of each object along with the visual data set corresponding to each object.

16. The method of claim 11, wherein:
the received video stream is an uncompressed video stream; and
the plurality of visual data sets is extracted from the uncompressed video stream.

17. The method of claim 11, wherein determining whether each newly generated visual data set needs to be included in the subset comprises determining whether each newly generated visual data set needs to be included in the subset further based on bandwidth information of the communication network.

18. The method of claim 11, wherein:
the plurality of object areas comprises first and second object areas respectively corresponding to first and second objects,
the plurality of visual data sets previously transmitted to the remote system comprises first and second previously transmitted visual data sets respectively corresponding to the first and second object areas, the first previously transmitted visual data set having the confidence value higher than that of the second previously visual data sets,
the plurality of newly generated visual data sets comprises first and second newly generated visual data sets respectively corresponding to the first and second object areas, and
determining the transmission priority of each newly generated visual data set comprises setting the transmission priority of the first newly generated visual data to be lower than that of the second newly generated object area.

19. The method of claim 11, wherein:
the plurality of object areas comprises first and second object areas respectively corresponding to first and second objects,
the plurality of visual data sets previously transmitted to the remote system comprises first and second most recently transmitted visual data sets respectively corresponding to the first and second object areas, the first most recently transmitted visual data set being transmitted prior to transmitting the second most recently transmitted visual data sets, the plurality of newly generated visual data sets comprises first and second newly generated visual data sets respectively corresponding to the first and second object areas, and determining the transmission priority of each newly generated visual data set comprises setting the transmission priority of the first newly generated visual data to be higher than that of the second newly generated object area.

20. A non-transitory computer-readable medium comprising instructions that, when executed by a processor, cause the processor to control a system to perform functions for reducing an amount of data transmitted to a remote system for remote image processing to identify a plurality of objects in a scene, the functions comprising:

receiving a video stream capturing the scene including the plurality of objects that are independently movable;

identifying, within the scene captured in the received video stream, a plurality of object areas respectively corresponding to the plurality of objects, each object area capturing a visual feature of the corresponding object;

tracking the plurality of object areas within the scene captured in the received video stream over a time;

generating, based on the tracking of the plurality of object areas, a plurality of visual data sets respectively representing visual characteristics of the plurality of object areas in the scene captured, wherein generating the plurality of visual data sets is repeated at a plurality of different times such that the plurality of visual data sets is newly generated at each different time to respectively represent the visual characteristics of the plurality of object areas in the scene captured at each different time;

in response to the plurality of visual data sets being newly generated at each different time, performing functions of:

determining a transmission priority of each newly generated object visual data set based on at least one of:

a confidence value of each visual data set previously transmitted to the remote system via a communication network, the confidence value determined by the remote system and indicating a confidence level of an identity of the object corresponding to the object area represented by each newly generated visual data set;

a most recent time that the visual data set representing each object area has been transmitted to the remote system for the remote image processing; and an occurrence of a new object area due to a new object appearing in the scene captured in the received video stream;

determining, based on the transmission priority of each newly generated visual data set, whether each newly generated visual data set needs to be included in a subset for transmission to the remote system for the remote image processing, the subset including less than all of the plurality of newly generated visual data sets; and transmitting, to the remote system via the communication network, only the subset for the remote image processing to remotely identify, at the remote system, the object corresponding to each visual data set included in the transmitted subset.

\* \* \* \* \*